E. H. KOKEN.
VEHICLE WHEEL RIM.
APPLICATION FILED AUG. 5, 1912.

1,117,134.

Patented Nov. 10, 1914.

Witnesses:
A. L. McClintock
Clyde Hoffner

Inventor
E. H. Koken
by C. E. Humphrey
Atty.

UNITED STATES PATENT OFFICE.

EDWARD H. KOKEN, OF AKRON, OHIO.

VEHICLE WHEEL-RIM.

1,117,134.  Specification of Letters Patent.  Patented Nov. 10, 1914.

Application filed August 5, 1912. Serial No. 713,477.

*To all whom it may concern:*

Be it known that I, EDWARD H. KOKEN, a citizen of the United States, residing at Akron, in the county of Summit and State of Ohio, have invented new and useful Improvements in Vehicle Wheel-Rims, of which the following is a specification.

This invention relates to improvements in vehicle wheel rims of the type adapted to hold an elastic or cushion tire, and the object of the invention is, broadly speaking, to provide a rim which will securely hold an elastic tire in its proper seat on the rim and simultaneously contract or place a tension upon the base portion of the tire with a view of increasing the longevity of the tire and its general effectiveness. The contracting or compressing of the base also serving to prevent the unintentional displacement of the tire and the danger of its being torn from its position on the rim.

The invention further contemplates providing the tire-carrying rim at one side with an inturned clencher flange of the ordinary type and providing the opposite side of the rim with an inclined face. Coöperating with the inclined face is a split annular, contractible, tire-retaining band with its outer portion shaped to engage the lateral beading at one side of the tire and with an inner lateral portion adapted to engage the inclined side face of the rim in such a manner that as the band is drawn inwardly and transversely toward the tire it will contract and draw down the free side of the tire to compress or distort the base thereof and place the same under tension. At the same time as the tire is moved laterally on the outer face of the rim by the movement of the contractible band the beading on the opposite side will be forced laterally under the overhanging clencher flange, this movement serving to force it inwardly and compress the base portion of the tire adjacent to the flange so that the entire base of the tire is placed under tension.

With the foregoing and other objects in view, the invention consists in the novel construction, combination and arrangement of the parts constituting the invention to be hereinafter specifically described and illustrated in the accompanying drawings which form a part hereof wherein is shown the preferred embodiment of the invention, but it is to be understood that changes, variations and modifications can be resorted to which come within the scope of the claims hereunto appended.

Figures 1, 2:
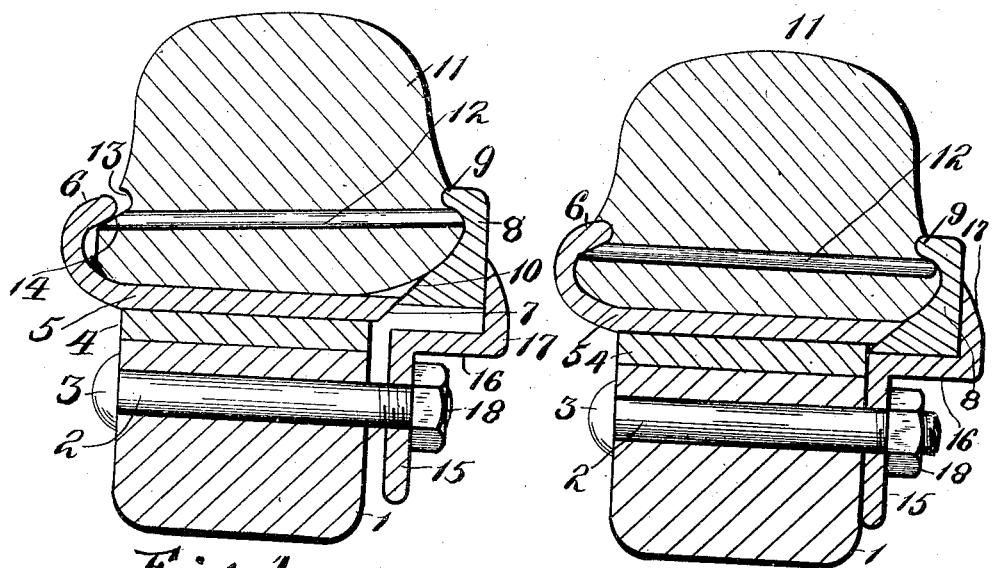
Figure 3:
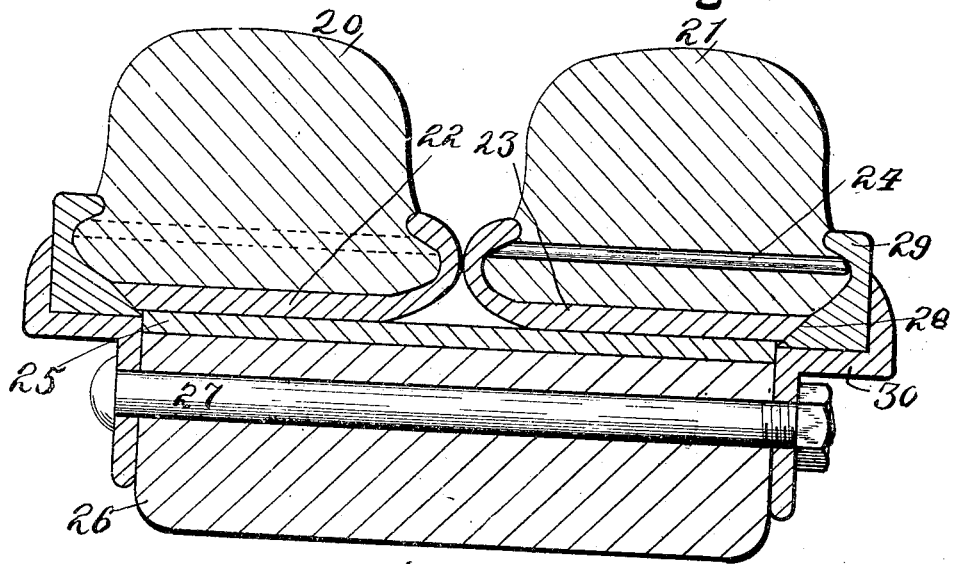

In the drawings in which similar reference numerals indicate like parts of the different figures, Figure 1, is a transverse sectional view of the rim portion of a vehicle wheel showing a tire mounted thereon and the tire-holding means in the position which it assumes during the seating of the tire; Fig. 2, is a similar view showing the tire held in position by the tire-holding means in position which it assumes when completely seated on the rim; and, Fig. 3, is a transverse sectional view of a rim adapted to carry a dual tire with twin tires seated thereon.

Referring to the drawings in detail, the reference numeral 1 indicates the felly of a vehicle wheel provided with a longitudinally-extending series of transverse openings 2 in which are mounted bolts 3 for a purpose to be later described. Mounted on the felly 1 is a felly-band 4. Mounted on the felly-band 4 is a tire-carrying rim 5 provided at one side with an inturned clencher flange of ordinary construction and the opposite side of the band is provided with an inclined portion 7. Coöperating with the inclined portion 7 is a split retaining ring 8 provided with a hook-shaped outer edge 9 for engagement with the tire and with a laterally-inclined portion 10 adapted to engage the inclined face 7 of the rim. Mounted on the rim 5 is an elastic tire 11 provided with a plurality of spaced transversely-extending wires 12 arranged in the base thereof. The tire is preferably provided with an inclined shoulder 13 on each side of the base. I prefer to form the ends of the cross-bars 12 which engage the clencher flange 6 with a cut-away portion 14 to lie flush with the shoulder 13 on that side of the tire.

It will be obvious that if the split ring 8 is contracted by being forced laterally toward the tire it will force the inclined ends of the bars 12 against the inner face of the clencher flange 6 and thereby force the bars and tire base inwardly toward the rim 5 and at the same time, as the ring 8 moves to the left in Figs. 1 and 2 it will be contracted and draw inwardly the side of the tire which it engages.

In order to shift the split ring laterally I provide an annular band 15 provided with apertures to receive the bolts 3 and provided with a laterally-extending portion 16 which carries at its outer end an outwardly-extending flange 17 which engages the split ring 8. As the nuts 18 on the bolts 3 are drawn up the parts will assume the position shown in Fig. 2 with the cross bars 12 forced downwardly in the position shown in Fig. 2 thereby placing the base portion of the tire under tension.

It will be apparent that by employing a rim provided on one side with a clencher flange such as is shown in Figs. 1 and 2 the necessity for split rings 8 on both sides of the tire are obviated and the weight of the vehicle wheel and the expense of constructing the same are considerably reduced. It will be further apparent that if it is desired to construct what is known as a dual tire, that is to say, two tires mounted on a single wheel rim, difficulties will ordinarily be experienced in retaining the opposing beads of the tire along the central line of the rim, but by using the device in the construction shown in Figs. 1 and 2, these difficulties of securely holding the inner opposing side faces of the two tires on the rim is eliminated.

In Fig. 3, the two tires are designated by the reference numerals 20 and 21 and are mounted in rims respectively designated by the reference numerals 22 and 23 provided with transverse cross-bars 24. These rims 22 and 23 are mounted on a wide faced felly-band 25 mounted on a felly 26 through which extend bolts 27. In positioning these rims 22 and 23 on the felly-band 25 the clencher flanges will oppose each other and lie in contacting engagement and the outer inclined portions 28 of the rims will be reversely arranged. The outer lateral portions of the two tires are held through the medium of broken retaining rings 29 drawn into position through the medium of lateral clamping rings 30 the same as has been described with reference to Figs. 1 and 2. By this construction two similar tires may be mounted on a wheel rim and either of the tires may be removed or replaced at pleasure without interfering with the other, and at the same time, all the advantages obtained by the construction shown in Figs. 1 and 2 are secured and the laterally opposing portions of the bases of the two tires are securely held against movement.

I claim:

1. The combination with a wheel rim comprising a body-portion extending transversely of the felly-band, and provided at one edge with an integral clencher flange, and having its opposite edge inclined, and a felly-rim provided with an outwardly extending flange of a tire seated on said body-portion and formed on each side with a circumferential groove, a split ring interposed between the felly-rim flange and tire, and having its inner edge inclined to adapt it to slide under the inclined edge of the rim, and provided at its outer edge with a flange to engage the tire, means for laterally-shifting said ring, and wires extending transversely through the tire and having their ends projecting at each side of the tire to engage below the ring flange and the clencher flange of the rim, said flanges projecting into said grooves and being locked between the ends of the wires and the outer walls of said grooves.

2. A vehicle wheel embodying a rim comprising duplex tire seats, one side of each of the seats being formed into an inturned clencher flange and the other side thereof being inclined, cushion tires on said seats formed with opposite circumferential grooves, split contractible tire-retaining rings each having an inclined lateral face opposing the like face of the tire seat and adapted to project under the inclined faces of the tire seat and arranged to be contracted in unison by engagement with the inclined sides of the seats, tires arranged within the seats, the outer portions of the rings being flanged to engage the bases of the tires on the side opposite to that engaged by the clencher flanges and being laterally shifted during their placement to force one side of each of the tire bases under the clencher flange while the other side is contracted by the split rings, means for simultaneously shifting the rings laterally to cause their contraction during the operation, and cross wires within the tire base having their projecting ends engaged below said flanges to lock the latter against the outer walls of said grooves.

3. A vehicle wheel embodying a rim comprising duplex tire seats, one side of each of the seats being formed into an inturned clencher flange and the other side thereof being inclined, split contractible tire-retaining rings each having an inclined lateral face opposing the like face of the tire seat and adapted to project under the inclined faces of the tire seat and arranged to be contracted in unison by engagement with the inclined sides of the seats, tires arranged within the seats, the outer portions of the rings being flanged to engage the bases of the tires on the side opposite to that engaged by the clencher flanges and being laterally shifted during their placement to force one side of each of the tire bases under the clencher flange while the other side is contracted by the split rings, means for simultaneously shifting the rings laterally to cause their contraction during the operation, and cross wires within the tire base having their projecting ends engaged below said flanges.

In testimony whereof I have hereunto set my hand in presence of two subscribing witnesses.

EDWARD H. KOKEN.

Witnesses:
C. E. HUMPHREY,
A. L. McCLINTOCK.